Figure 1A:
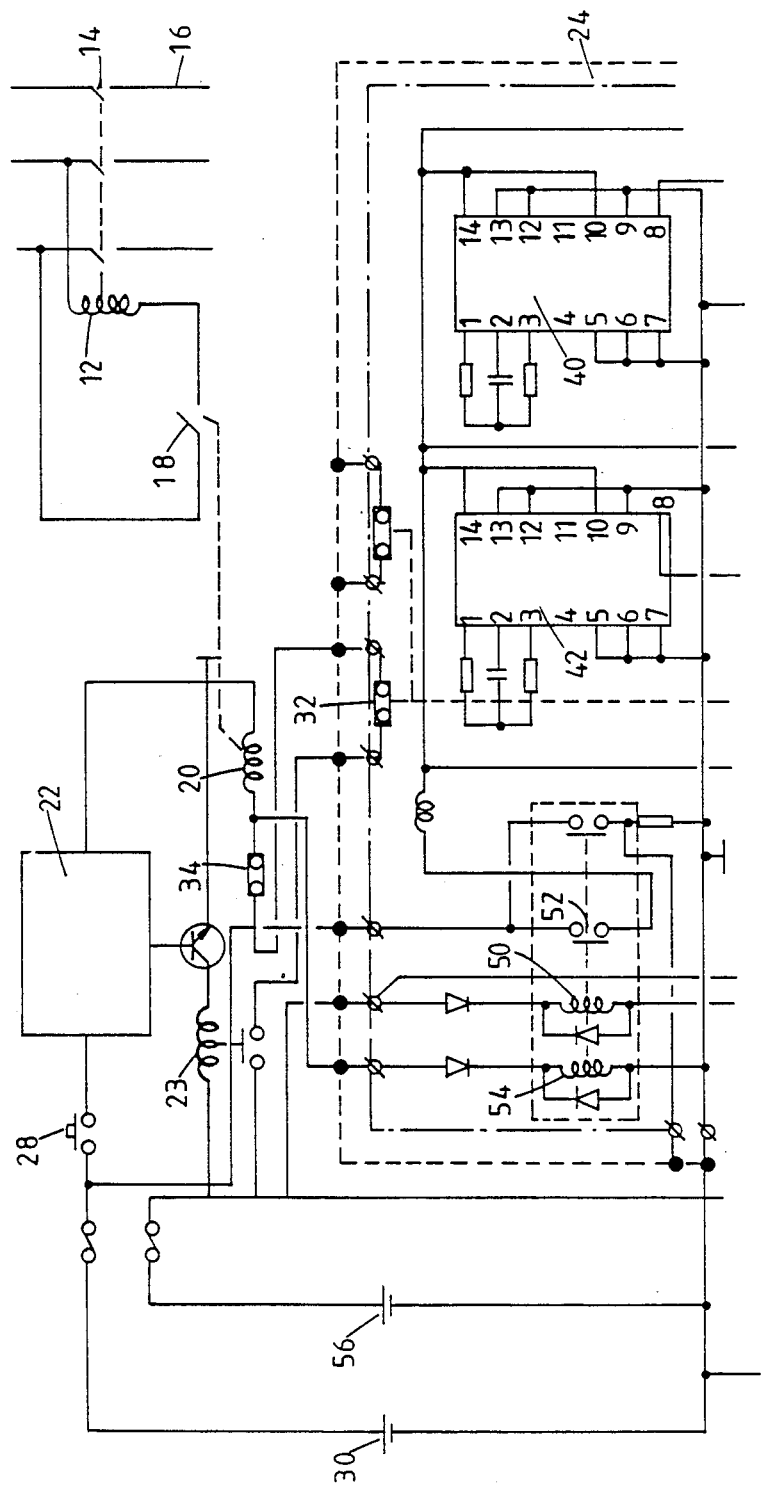

United States Patent [19]

Stewart

[11] Patent Number: 4,899,247

[45] Date of Patent: Feb. 6, 1990

[54] AUTO RECLOSER COIL BURN-OUT PROTECTION

[75] Inventor: John S. Stewart, Nottingham, United Kingdom

[73] Assignee: Brush Switchgear Limited, Loughborough, England

[21] Appl. No.: 215,731

[22] Filed: Jul. 6, 1988

[30] Foreign Application Priority Data

Jul. 7, 1987 [GB] United Kingdom ............... 8715934

[51] Int. Cl.$^4$ .............................................. H02H 3/07
[52] U.S. Cl. ................................... 361/72; 361/75; 361/115; 361/166; 361/168.1
[58] Field of Search ................. 361/71, 72, 73, 74, 361/75, 85, 115, 160, 166, 167, 168.1, 169.1, 210

[56] References Cited

U.S. PATENT DOCUMENTS

| 3,381,176 | 4/1968 | Riebs | 361/72 |
| 3,560,798 | 2/1971 | Tenenbaum et al. | 361/73 |
| 3,846,676 | 11/1974 | Ryczek et al. | 361/115 |
| 4,680,706 | 7/1988 | Bray | 361/75 |
| 4,757,416 | 7/1988 | Wilkerson | 361/85 X |

*Primary Examiner*—William M. Shoop, Jr.
*Assistant Examiner*—H. L. Williams
*Attorney, Agent, or Firm*—Spensley Horn Jubas & Lubitz

[57] ABSTRACT

An auto-recloser for a power line has a high voltage closing coil (12) for closing the main contact (14) in the power line, the closing coil being energized via a non-latching switching (18) in turn controlled by a low voltage closing coil (20). A time closing pulse is applied to the low voltage coil (20) to close switch (18) for a very short time period. A coil protection (24) monitors the status of the main contacts (14) and if these have not closed after a preselected time period of typically 100 ms then the protection circuit opens a normally closed switch in series with the low voltage coil (20) to prevent further closing pulses being applied in further attempts to close the main contacts (14).

16 Claims, 2 Drawing Sheets

AUTO RECLOSER COIL BURN-OUT PROTECTION

The present invention relates to the protection of auto recloser coils.

High voltage circuit breakers are used in high voltage power lines, e.g. with fault detection circuitry which trips the circuit breakers when a fault current is detected in the power line. Such high voltage circuit breakers include a high voltage solenoid which is used automatically to close the circuit breaker in response to a closing signal after a pre-set time. Such a high voltage solenoid derives its power for operation from the source side of the overhead power line. The solenoid is usually connected across two of the phases by switches at the time that power is required for closing and is automatically disconnected at the end of the closing stroke to give complete isolation of the solenoid from the overhead line.

A major disadvantage of such an auto-recloser is the susceptibility of the solenoid to burn-out as a result of voltage on the source side of the power line being at a lower value than the minimum voltage level at which the solenoid would close the circuit breaker. The induced current through the coil causes the latter to overheat and burn out. Low voltage on the source side of the power line can be caused, for example, by a break in the line up-stream from the auto-recloser, or poor voltage regulation.

Attempts have been made in the past to overcome this problem by using fuse links in the solenoid circuit but these have also suffered from failure and in any event, if a fuse link does operate correctly then the fuse has to be replaced manually, which is both costly and time consuming.

The present invention seeks to provide an improved auto-recloser.

The present invention provides an auto-recloser for a power line comprising:

a high voltage closing coil means for closing the main contacts of the auto-recloser in the power line;

non-latching switch means for controlling energising of said closing coil;

a control circuit for generating a closing pulse to close said non-latching switch means; and circuit means for monitoring the status of said main contacts and preventing energising of said closing coil in response to said main contacts being open a preselected time after generation of said closing pulse.

Figure 1B:
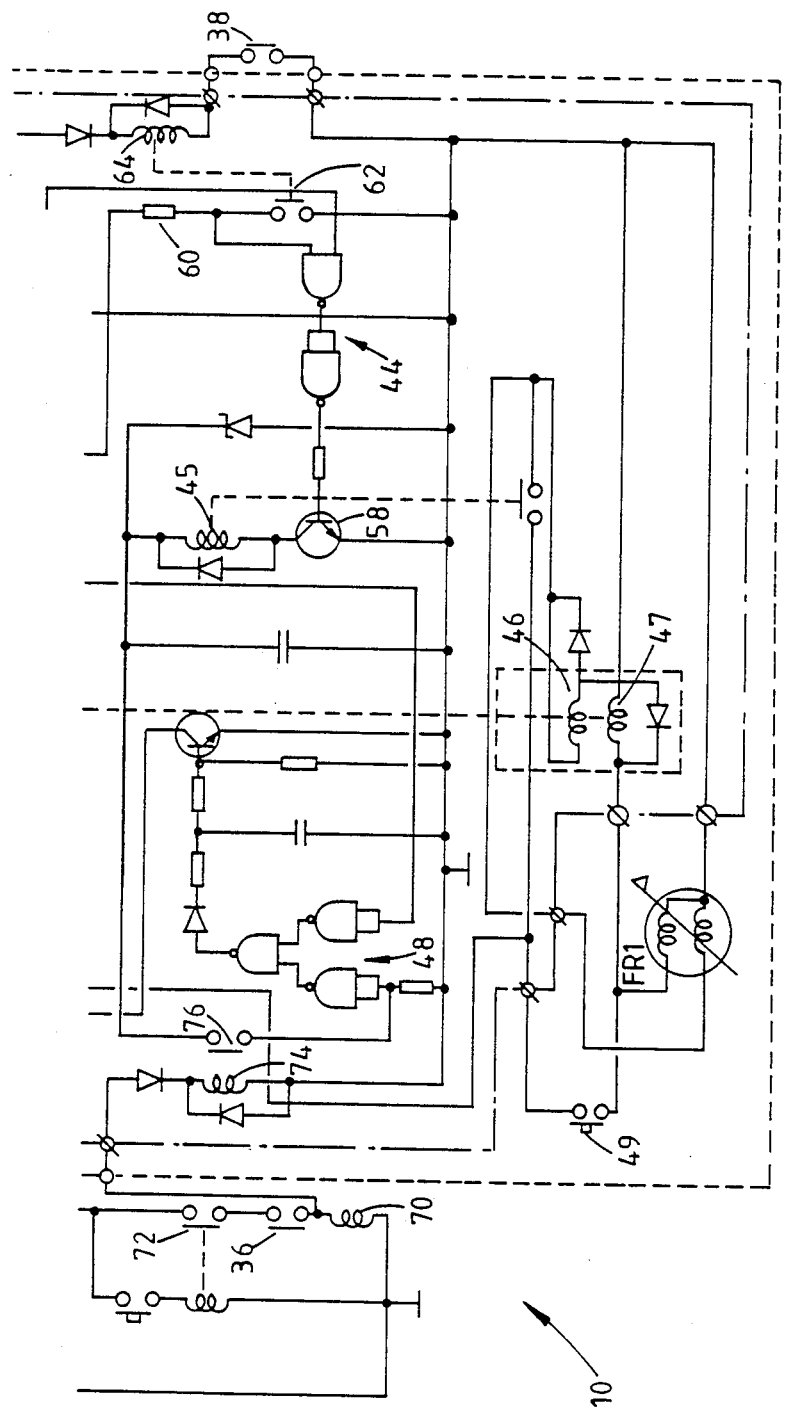

The present invention is further described hereinafter, by way of example, with reference to the accompanying drawing FIGS. 1A and 1B which are a schematic circuit diagram of an auto-recloser with a preferred form of solenoid protection circuit according to the present invention.

Referring to the drawing, an auto-recloser (10) has a high voltage closing solenoid (12) which controls main contacts (14) of the auto-recloser in a three phase high voltage power line (16). The high voltage solenoid (12) is connected directly to two of the phases of the line (16) via a double-break switch (18) which is in turn controlled by a low voltage coil (20) triggered by a control circuit (22) via a relay (23). A protection circuit (24) for the high voltage solenoid (12) is connected to the power supply circuit of the low voltage coil (20).

When the low voltage coil (20) is momentarily energised by a pulse from the control circuit (22) it closes the double break switch (18) for the duration of the pulse only. In conventional auto-reclosers the double-break switch is self-latching and latches in the closed position. Power is therefore supplied to the high voltage solenoid (12) which closes the main contacts (14) of the auto-recloser. The closing mechanism of the main contacts (14), after closing of the main contacts, mechanically re-sets the double break switch (18) into its open position, disconnecting the solenoid (12) from the power line.

The normal closing time of the main contacts (14) is approximately 60 mS at full supply voltage. If, for any reason, the main contacts (14) could not close and therefore the double break switch (18) remained latched in its closed position, the solenoid (12) would suffer permanent damage after about 4 seconds and would burn out with possibly disastrous results.

In the illustrated form of auto-recloser according to the present invention, the double break switch (18) is a non-latching spring return type double-break switch which cannot therefore latch itself into a permanent closed position. The double break switch (18) remains closed only so long as a closing pulse is applied to the low voltage coil (20). Closing pulses are supplied from the control circuit (22) which is a close pulse conditioning circuit energised by closing of a close switch (28). This can be manually or relay activated. Power supply for the circuit (22) is derived from a twelve volt battery (30). The closing pulse itself is applied to the low voltage coil (20) through normally closed relay circuit (32) and breaker auxiliary contacts (34) which are mechanically coupled to the main contacts (14) such that when the latter are open the auxiliary contacts (34) are closed. When the main contacts (14) close, the auxiliary contacts (34) are mechanically opened.

The main contacts (14) are also mechanically coupled to two further sets of breaker auxiliary contacts (36) and (38), both of which are normally open when the main contacts (14) are open.

The coil protection circuit includes two timers (40), (42) which are set to provide an output pulse respectively after 100 mS and 150 mS. The output of timer (40) is applied to an AND gate (44) which controls a SET coil (46) of relay contacts (32) via a control relay (45), coil (46) opening the contacts when energised to disable the low voltage coil (20) and prevent energisation of coil (12). The output of timer (42) is connected to an OR gate (48) which controls a RE-SET coil (50) of normally open contacts (52), the latter controlling power supplied from the 12 volt battery (30) to the coil (45) and the timers. Contacts (52) also have a SET coil (54) coupled to the circuit of the low voltage coil (20) such that it is energised by the closing pulse supplied to the coil (20) as will be explained in greater detail below, the RE-SET coil (50), SET coil (54) and control switch (52) provide a control circuit to control application of power to the timing circuit (40), and to enable the AND gate (44).

Initially, the breaker auxiliary contacts (34) are closed and following generation of a close pulse, the low voltage coil (20) closes the break switch (18) for a period of typically 70 mS. This in turn energises the high voltage coil (12) to close the auto-recloser main contacts (14). The closing pulse also energises the SET coil (54) which closes relay contacts (52). Contacts (52) are self-latching and therefore remain closed.

The closing of contacts (52) applies power from the 12 volt battery (30), to the timers (40), (42), the coils (45, 64) and one input of the AND gate 44. The coil (45) is connected in series with a transistor switch (58) controlled by AND gate (44). At this stage, because the output of timer (40) is low the output of AND gate (44) is low and therefore the transistor switch (58) is OFF and coil (45) remains unenergised. As a result, coil (46) is unenergised and contacts (32) remain closed.

The application of power to the timers (40), (42) causes these to begin counting. After 100 mS the output of timer (40) goes high, this being applied to a second input of AND gate (44). The first input of AND gate (44) is connected to the junction of a resistance (60) and normally open contacts (62) of relay coil (64). Relay coil (64) is connected in series with breaker auxiliary contacts (38). Resistance (60) is connected to the 12 volt battery (30) via contacts (52) and therefore while contacts (62) are open the first input of AND gate (44) is held high.

If, at the end of 100 mS, when the output of timer (40) goes high, the auto-recloser main contacts (14) are still open then the breaker auxiliary contacts (38) will still be open. Coil (64) will therefore be unenergised and contacts (62) will remain open. The first input of AND gate (44) will therefore be held high. When the output of timer (40) goes high the output of AND gate (44) will therefore also go high, closing transistor switch (58) and energising coil (45) to energise SET coil (46) and open contacts (32). The opening of contacts (32) isolates the coil (20) from the close pulse conditioning circuit (22), thus preventing any further closing pulses from the latter energising coil (20) and therefore coil (12).

A magnetic flag indicator FR1 which is "set" by coil (45) and "reset" by a manual pushbutton is provided to give a visual indication that the contacts (14) have failed to close and the protection circuit has been operated.

After 150 ms timer (42) re-sets the coil protection circuit via OR gate (48) which energises the RE-SET coil (50) to open contacts (52).

The opening of contacts (52) removes power from the timers (40,42) and the coils (45, 46) to reset the circuit. The contacts (32) remain open and the magnetic flag indicator FR1 visually indicates that the protection circuit has tripped. Resetting of the contacts (32) to close them is effected manually by closing pushbutton (49) to energise the reset coil (47). The circuit is then ready for further operation.

If, following generation of a closing pulse, the main contacts (14) close then auxiliary contacts (34) open to prevent further closing pulses being applied to coil 20. Auxiliary contacts (36, 38) are also opened by closing of contacts (14). The closing of contacts (38) energises coil (64) to close contacts (62) and hold the second input of AND gate low. Therefore, at the end of its 100 ms count, although the output of timer (40) goes high AND gate (44) is inhibited by the inhibit circuit of coil (64), contacts (62) and inhibit switch (38), and SET coil (46) is not energised. Contacts (32) therefore remain closed.

The auto-recloser also includes a main contact breaker trip coil (70) which is connected through the breaker auxiliary contacts (36) and normally open trip contacts (72) to the 24 volt battery (56) supplying the low voltage coil (20). Contacts (36) remain open when main contacts (14) are open and coils (70) and (74) are therefore deactivated, leaving contacts (76) open. In the condition where contacts (14) are closed, contacts (36) are also closed and the trip initiate contact (72) can be closed manually or electronically by a line fault detection circuit which detects when a line fault occurs.

This energises the breaker trip coil (70) and opens the main contacts (14). A relay coil (74) of the coil protection circuit (24) is connected in parallel with the breaker trip coil (70) and controls normally open contacts (76). When the trip initiate contact (72) closes, before the breaker auxiliary contacts (36) open the coil (72) closes contacts (76). The latter are connected between a second input of OR gate (48) and contacts (52) so that when the contacts (52) and (76) are closed (contacts (32) also being closed) voltage from the 12 volt battery (30) is applied to the second input of OR gate (48). This causes the output of the OR gate (48) to go high, energising the RESET coil (50) of contacts (52) to open the latter if they are closed and reset the coil protection circuit.

100 ms after generation of a close pulse from the close pulse conditioning circuit (26), the auto-recloser described and illustrated above, tests whether or not the main contacts (14) are closed. If these are not closed, the coil protection circuit opens the normally closed contacts (32) inhibiting further attempts to close the main contacts (14). If the contacts (14) do close and there is no trip pulse via the trip coil (70) to re-set the coil protection circuit then it is re-set by the timer (42) after 150 ms.

What is claimed;

1. An auto-recloser for a power line comprising:
   main contacts coupled to the power line;
   a high voltage closing coil means for closing the main contacts of the auto-recloser in the power line;
   non-latching switch means for controlling energising of said closing coil;
   a control circuit for generating a closing pulse to close said non-latching switch means; and
   circuit means for monitoring the status of said main contacts and preventing energising of said closing coil in response to said main contacts being open a preselected time after generation of said closing pulse;
   wherein said control circuit comprises a low voltage coil means for closing said switch means in response to application of said closing pulse; and second switch means controlled by said circuit means for controlling application of said closing pulse to said low voltage coil means; and
   wherein said second switch means includes a first, set coil means energisable to actuate said second switch means to prevent application of said closing pulse to said low voltage coil means and a second, reset coil means energisable to reset said second switch means.

2. An auto-recloser as claimed in claim 1 wherein said second switch means includes a third switch in series with said low voltage coil means and said first, set coil means is energisable to open said third switch and said second, reset coil means is energisable to close said third switch.

3. An auto-recloser as claimed in claim 1 wherein said circuit means further comprises:
   a first timing circuit operable to commence timing in response to generation of said closing pulse and to generate a trip pulse after, a first preselected time period for tripping said second switch means to prevent energising of said closing coil means.

4. An auto-recloser as claimed in claim 3 further comprising first gate means coupling said first timing circuit to said second switch means to apply said trip pulse to said second switch means; and inhibit means for monitoring the status of said main contacts, said inhibit means being coupled to said gate means for preventing application of said trip pulse to said second switch means when said main contacts are closed.

5. An auto-recloser as claimed in claim 4 wherein said first gate means comprises an AND gate;

said first timing circuit and said inhibit means are coupled respectively to first and second inputs of said first gate means;

said first timing circuit is operable to apply a logic 1 signal to said first input of said AND gate after said first preselected time period; and said circuit means comprises control means operable in response to receipt of said closing pulse to actuate said first timing circuit and apply a logic 1 signal to said second input of said AND gate.

6. An auto-recloser as claimed in claim 5 wherein said inhibit means includes inhibit switch means mechanically coupled to said main contacts for opening and closing with said main contacts and is operable on closing of said inhibit switch means to remove said logic 1 signal from the second input of said AND gate.

7. An auto-recloser as claimed in claim 6 wherein said control means comprises control switch means actuable in response to receipt of said closing pulse by said control means to initiate timing of said first timing circuit and to arm said inhibit means.

8. An auto-recloser as claimed in claim 7 further comprising a second timing circuit operable to reset said first timing circuit after a second preselected time period greater than said first preselected time period.

9. An auto-recloser as claimed in claim 8 wherein said second timing circuit is operable to commence timing in response to generation of said closing pulse.

10. An auto-recloser as claimed in claim 9 wherein said control switch means is actuable in response to receipt of said closing pulse by said control means to initiate timing of said second timing circuit.

11. An auto-recloser as claimed in claim 10 further comprising a trip circuit operable in response to receipt of a fault pulse indicating a fault in said power line to open said main contact.

12. An auto-recloser as claimed in claim 11 wherein said trip circuit means includes trip switch means mechanically coupled to said main contacts for opening and closing with said main contacts such that when said main contacts are open said trip circuit means is disarmed.

13. An auto-recloser as claimed in claim 11 wherein said trip circuit is operable in response to said fault pulse to deactuate said control switch means to reset said first and second timing circuits and disarm said inhibit means.

14. An auto-recloser as claimed in claim 8 wherein said second timing circuit is coupled to said control means and is operable to deactuate said control switch means after said second preselected time period to reset said first timing circuit and disarm said inhibit means.

15. An auto-recloser as claimed in claim 14 wherein deactuation of said control switch means resets said second timing circuit.

16. An auto-recloser as claimed in claim 14 wherein actuation of said control switch means applies power to said timing circuits to initiate timing thereof and to said inhibit means to arm said inhibit means, and deactuation of said control switch means removes power to said timing circuits and said inhibit means.

* * * * *